April 10, 1934.  F. STEBLER  1,954,654
PROGRESSOR FOR A TRANSVERSE BRUSH FRUIT TREATING MACHINE
Filed Dec. 24, 1932   6 Sheets-Sheet 2

Fig. 2.

Inventor
Fred Stebler
By Lyon & Lyon
Attorneys

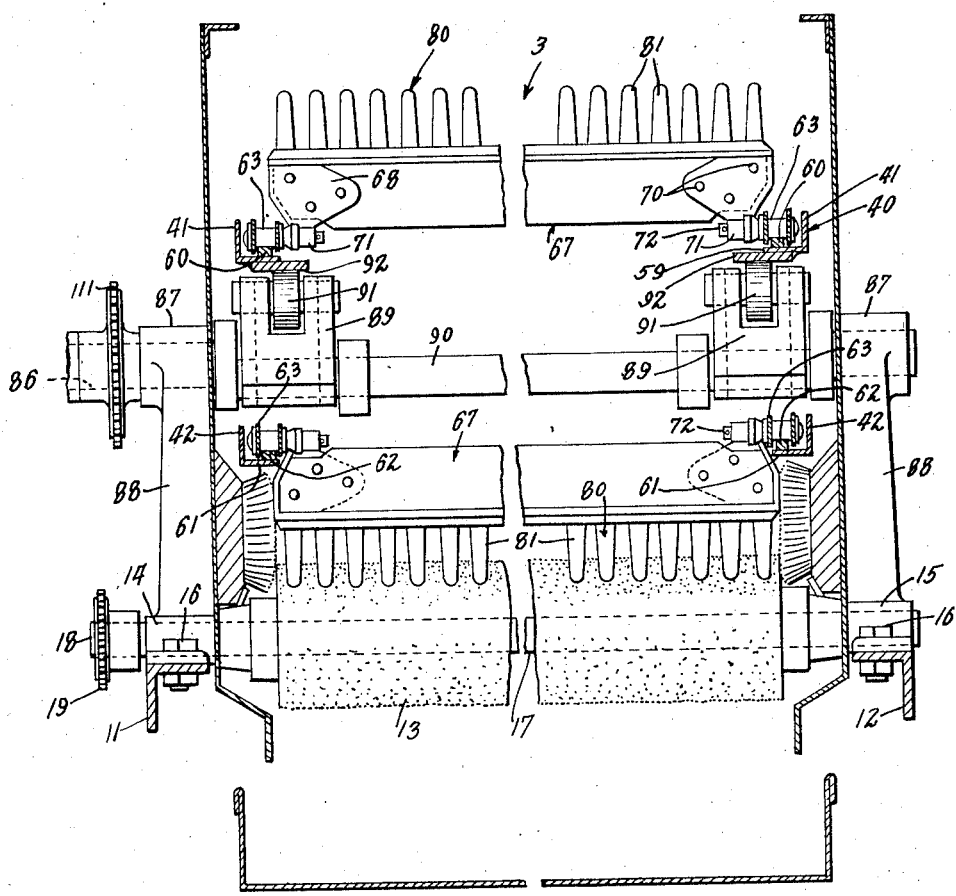

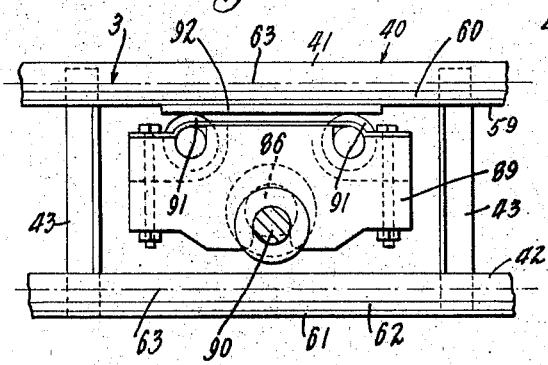
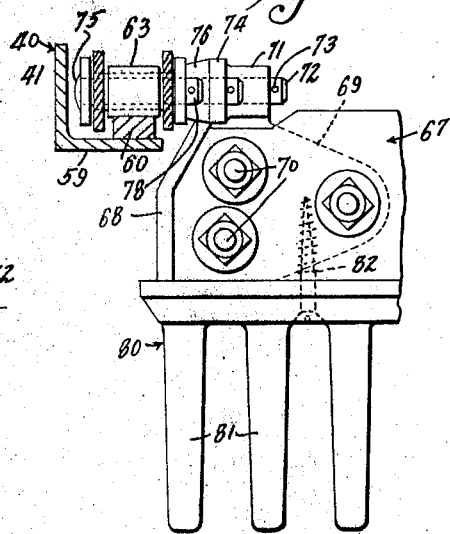
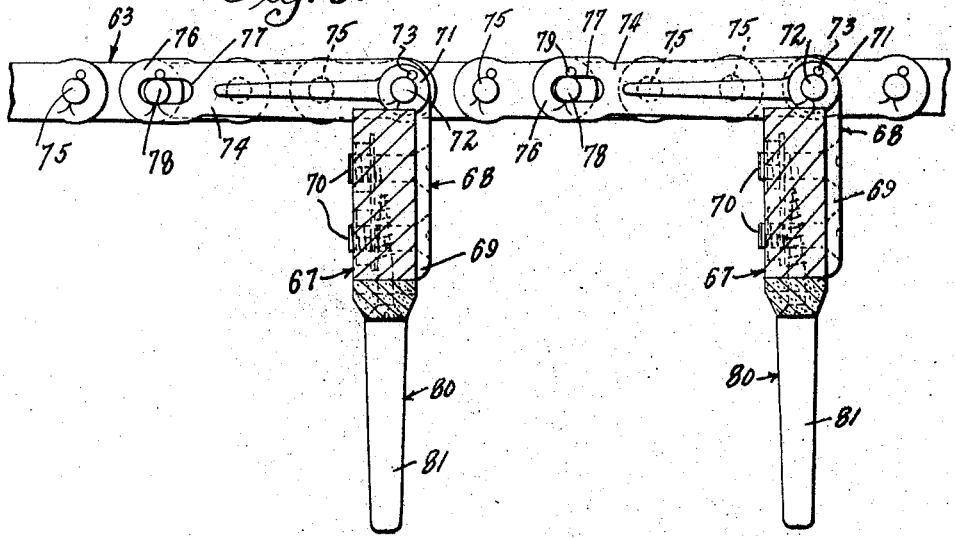

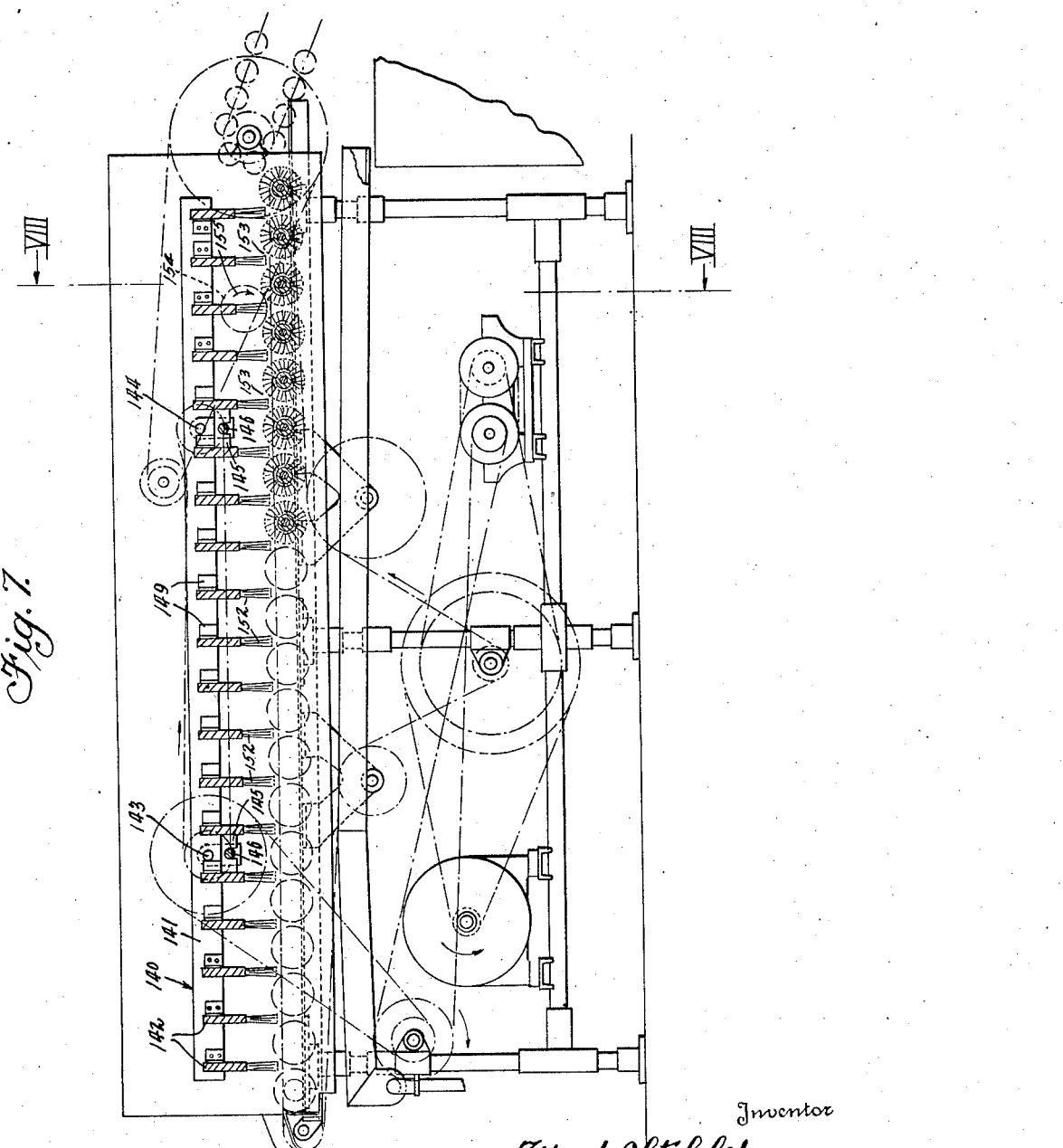

April 10, 1934.  F. STEBLER  1,954,654
PROGRESSOR FOR A TRANSVERSE BRUSH FRUIT TREATING MACHINE
Filed Dec. 24, 1932  6 Sheets-Sheet 6

Inventor
Fred Stebler
By Lyon & Lyon
Attorneys

Patented Apr. 10, 1934

1,954,654

UNITED STATES PATENT OFFICE 1,954,654

PROGRESSOR FOR A TRANSVERSE BRUSH FRUIT TREATING MACHINE

Fred Stebler, Riverside, Calif., assignor to Food Machinery Corporation, San Jose, Calif., a corporation of Delaware Application December 24, 1932, Serial No. 648,769

REISSUED

14 Claims. (Cl. 198—127)

This invention relates to a mechanism to be applied to a fruit treating machine for boosting, or as may be termed "progressing" the fruit lodged in the trough between one set of the transverse brushes to the next trough, and so on until the fruit will have traversed all of the brushes of the machine.

The ordinary fruit treating machine is usually provided with a plurality of cylindrical brushes mounted transversely of the longitudinal axis of the machine in parallel relation. All of the cylindrical brushes may be rotated in the same direction, and at an appropriate speed to insure that the fruit will be correctly treated while passing through the machine. However, fruit brushing machines of this type in which transverse cylindrical brushes are employed for the purpose of abrading the surface of the fruit, require that the fruit be progressed through the machine by the "displacement" method. In other words, the forward progress or passage of the fruit is caused by revolving the transverse brushes all in one direction, and by feeding the fruit continuously on the top of the brushes, and as the top surface of all the brushes is moving in the same direction, the fruit fed onto the brushes naturally is caused to move forward and align itself in rows in the valleys or troughs formed between the peripheries of the brushes, and the fruit will remain in these valleys, rolling over and over until additional fruit is fed into the machine, which fruit, being crowded forward, will displace and shove the lodged fruit forward into the next succeeding valley, and so on until the fruit has completed its course through the machine. It will thus be seen that the forward progress of the fruit depends solely upon the feeding of additional fruit, there being no positive means to give a definite and orderly rate of forward travel to each piece of fruit, whereby each piece of fruit may receive the same amount of treatment. It has been found that fruit being forwarded by the "displacement" method through a treating machine, will tend to lag along the sides of the machine, and that fruit of different sizes intermingle and do not have a uniform forward progress, thus resulting in an over treatment of some of the pieces of fruit, and an insufficient treatment of other pieces.

It is an object of this invention to provide a mechanism for a fruit treating machine which will operate to positively and uniformly progress all of the fruit through the machine, whereby each piece of fruit, whether large or small, close to the sides or center, will receive the same degree of treatment while passing through the machine.

A further object is to provide such a progressing mechanism which will not injure the fruit while progressing the fruit through the machine.

A further object is to provide a progressing means which will substantially follow the adjacent contour of the rotating brushes whereby the fruit engaged by the progressing means will be gently boosted or lifted out of the valleys or troughs formed between the brushes.

A further object is to provide means for reciprocating the progressor cradle and for driving the conveyor means in timed relation whereby the fruit engaging fingers will follow the adjacent contour of the treating brushes.

A further object is to provide means for reciprocating the progressor cradle in a vertical plane, and for preventing motion of the cradle in a longitudinal direction.

A further object is to provide the progressor means with resilient fruit engaging fingers, whereby the fruit contacted by these fingers may be yieldingly urged out of the troughs formed between the treating brushes.

A further object is to provide a plurality of crankshafts transversely journalled upon the treating machine frame, and for journaling crosshead means upon the throws of the crankshafts and for slidably mounting the progressor frame upon the crossheads so that by rotating of the crankshafts the progressor frame will be reciprocated in a vertical plane, and for providing an anchor means for retaining the progressor frame from a longitudinal motion, which is rendered possible due to the sliding engagement between the frame and crossheads.

A further object is to provide means for feeding the fruit onto the treating brushes in timed relation with the operation of the progressor means.

A further object is to provide means whereby the speed of the progressor and the fruit feeding means may be changed without altering the speed of the treating brushes.

A further object is to provide the drive means for the progressor and fruit feeding means, with a change speed means whereby the rate of travel of the fruit through the treating machine may be nicely adjusted.

A further object as exemplified in the modified form of the invention, is to provide a treating machine with a plurality of transversely journalled crankshafts, upon the throws of which the progressor frame may be journalled, and to provide the frame with fixed fruit engaging means spaced along the frame at distances substantially equal to the spacing of the treating brushes of the machine, and for providing means for simultaneously driving the crankshafts.

A further object is to provide a fruit feeding means which will deliver a row of fruit to the brushing machine for each cycle of operation of the progressor.

Other objects and advantages of the invention will become apparent as the nature of the same is more fully understood from the following description and accompanying drawings wherein is set forth what is now considered to be a preferred embodiment. It should be understood, however, that this particular embodiment of the invention is chosen principally for the purpose of exemplification, and that variations therefrom in details of construction or arrangement of parts, may accordingly be effected and yet remain within the spirit and scope of the invention as the same is set forth in the appended claims.

In the drawings:

Figure 2 illustrates a sectional view taken substantially in the plane of line 2—2 of Figure 1.

Figure 3 illustrates an enlarged sectional view taken substantially in the plane of line 3—3 of Figure 1.

Figure 4 illustrates an enlarged, fragmental, sectional view taken substantially in the plane of line 4—4 of Figure 1.

Figure 5 illustrates an enlarged, fragmental, sectional view of one end of the progressor bar, and its mounting upon the progressor conveyor.

Figure 6 illustrates an end view of Figure 5, in which view the progressor supporting rail has been removed.

Figure 7 illustrates a sectional side elevation of a modified form of the invention.

Figure 1:
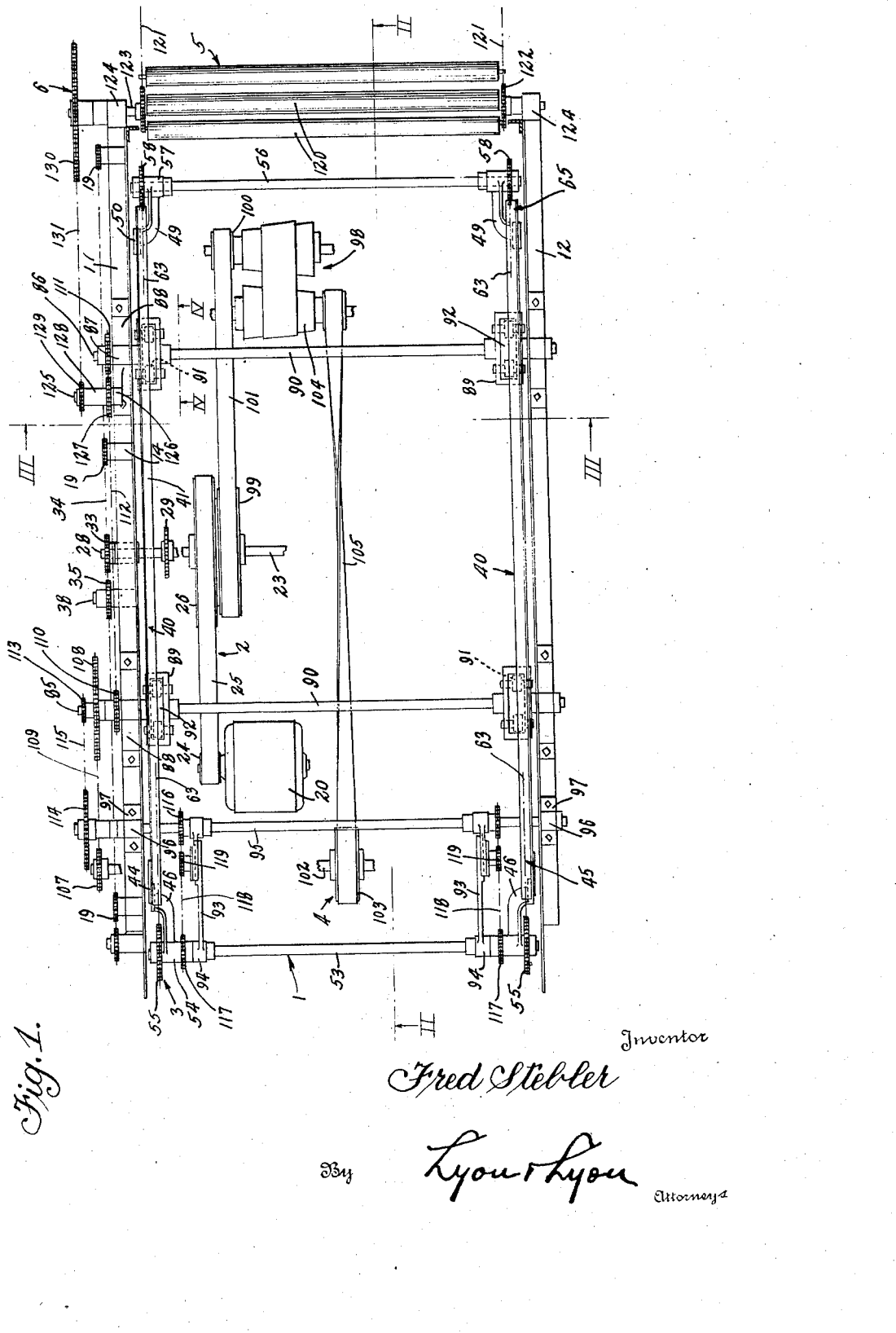
Figure 1 illustrates a plan view in which some of the parts have been removed to more clearly show the drive means for the several elements.

In the preferred form of the invention as illustrated in the drawings, the invention may broadly include a fruit brushing machine 1, a drive means 2 therefor, a progressor mechanism 3, a drive means 4 therefor, a fruit feed means 5, and a drive means 6 arranged to drive the fruit feed means in timed relation with the progressor mechanism.

The fruit brushing machine 1 may include a suitable frame 7 comprising pairs of standards 8, 9 and 10 for supporting the side rails 11 and 12. A series of cylindrical fruit treating or abrading brushes 13 may be suitably journalled in bearings 14 and 15, which bearings may be suitably fastened to their respective side rails 11 or 12 as by means of bolts 16. The fruit treating brushes may be in parallel relation and equally spaced along the side rails at distances sufficiently apart so that their peripheral surfaces do not contact one with the other. Each brush may be provided with a shaft 17 which, at one side of the machine, may be extended as at 18 to support a brush driving sprocket 19.

The drive means 2 for the brushing machine 1, may include an electric motor 20 supported upon frame 7 as by means of cross members 21, which members may be suitably mounted upon the longitudinal frame sills 22 carried by standards 8, 9 and 10. The motor may drive a countershaft 23 by means of the motor pulley 24, belt 25, and countershaft driving pulley 26. The countershaft 23 may be journalled transversely of frame 7 by means of bearings 27 carried by the center standards 9. The countershaft in turn may drive a jack shaft 28 by means of sprockets 29, 30, and chain 31. The jack shaft may be journalled directly above the countershaft in bearings 32 also carried by the center standards 9. The jack shaft 28 may be operatively connected to drive each of the treating brushes by providing the driving sprocket 33 at the outer end of the jack shaft in alignment with each of the brush driving sprockets 19, and playing the drive chain 34 around sprocket 33, and over all of the brush sprockets 19. By this arrangement all of the brushes will be driven in the same direction, and at the same speed. It may be desirable to provide the idler sprockets 35 and 36 at each side of the driving sprocket 33 and also the chain tightening sprocket 37. The idler sprockets 35 and 36 may be journalled upon suitable cross shafts 38 and 39, while the chain tightening may be adjustably mounted upon the frame in order that it may be moved to tighten the chain to a proper tension.

The progressor mechanism 3 may include a floating or progressor frame 40 including a pair of upper angle iron side rails 41, and a corresponding pair of lower angle iron side rails 42. Suitable brace members 43 may be provided for tying the upper and lower angle iron side rails together. A plate 44 may be provided at the end 45 of the frame to tie each set of upper and lower side rails together, and also to provide supporting means for the bearing brackets 46, which brackets may be adjustably fastened to their respective plates as by means of slots 47 through, which the bolts 48 may be played. Similar bearing brackets 49 may be adjustably mounted at the opposite end of the progressor frame as by means of plates 50, bracket slots 51 and bolts 52. A transverse drive shaft 53 may be journalled in bearings 54 carried by the bearing brackets 46, and may be provided with a pair of conveyor sprockets 55. And likewise, the transverse driven shaft 56 may be journalled in bearings 57 carried by the bearing brackets 49, and may be provided with a pair of conveyor sprockets 58. The upper side rails 41, (note Fig. 3), may be positioned so that one flange 59 of each angle may be substantially horizontal and directed inwardly toward the center of the machine, and may be provided with a track 60. The lower side rails 42 may be likewise arranged with the flanges 61 substantially horizontal and directed toward the center of the machine and each provided with a track 62.

A pair of endless progressor conveyor chains 63 may be played around the conveyor chain sprockets 55 and 58, and along the tracks 60 and 62 of the upper and lower side rails. As may be observed from Figure 2, the periphery of the sprockets 55 may be arranged so as to receive the chains 63 in tangential alignment with those portions of the chains traveling along the tracks 60 and 62 while the extreme ends of the tracks adjacent the sprockets 55 may be bent downwardly as at 64 to permit the chains to smoothly leave and ride onto tracks 60 and 62. If preferred, both ends of the side rails with their respective conveyor sprockets may be formed alike or the end 65 of each of the upper side rails 41 may be inclined toward its respective lower rail as illustrated in Figure 2. In this arrangement chain sprockets 58 of smaller diameter than the chain sprockets 55 may be used so as to receive the chains tangentially from the tracks 60 and to deliver the chains in tangential alignment with the tracks 62. Likewise, the extreme ends of the tracks adjacent the sprockets 58 may be bent downwardly as at 66 to permit the chain to smoothly leave and ride onto the tracks 60 and 62.

Progressor bars 67 as illustrated in Figs. 2, 3, 5 and 6, may be spaced along the entire length of chains 63 at intervals substantially equal to the distances between the centers of the treating brushes 13. The progressor bars 67 may be operatively mounted at each end to one of the conveyor chains as by means of bracket 68 having a flange portion 69 to which flange the end of the progressor bar 67 may be securely fastened as by means of bolts 70. Also the bracket 63 may be provided with a bearing boss 71 for operative engagement with the supporting pin 72 and locked thereon by means of the cotter key 73. In order to maintain the progressor bars 67 in vertical relation with respect to chains 63, the brackets 68 may be provided with arms 74 spaced sufficiently from the chain so as to bridge and not to interfere with the pins 75 thereof, and each may be provided with a boss 76 for engagement with the adjacent link of chain 63, and the boss 76 may be provided with a slot 77 through which slot the guide pin 78 may be played. A cotter key 79 may be provided for preventing the guide pin 78 from becoming displaced. The slot 77 in the arm 74 is important as it provides sufficient play for the guide pin 78 during the travel of the progressor bar around the chain sprockets. The chains throughout their length may be provided with the long supporting pins 72 and the shorter guide pins 78, whereby the progressor bars may be operatively supported upon the chains and each progressor bar spaced from the preceding bar a distance substantially equal to the distance between the centers of the treating brushes so that the progressor bars while traveling across the brushes, may act to simultaneously boost the fruit from one trough formed between adjacent brushes to the next trough.

Each progressor bar may be provided with fruit engaging members 80. As illustrated in Figures 5 and 6, the members 80 may be made of moulded rubber or other suitable material, and having fruit engaging fingers 81, and fastened to the progressor bars by suitable means such as by means of screws 82. In cases where the moulded rubber members are to be used, the fingers 81 thereof should be spaced close enough to engage and boost the smallest articles from one trough to the next. In other words, the fingers 81 should not be spaced apart so as to permit small size fruit to slip between the fingers. The advantage of using the rubber fingers 81 resides in providing a relatively soft, resilient means for engaging and boosting the fruit along its course without causing the fruit to be injured or bruised. In place of the fruit engaging members 80 illustrated in Figures 5 and 6, a sheet of canvas or rubber may be suitably secured upon the progressor bars, or the fruit engaging means may be made of brush bristles. As may be noted from Figures 2 and 3, the fruit engaging fingers 81 may project into the troughs 83 formed between adjacent treating brushes when the progressor frame 40 is at its lowest position. As the fruit engaging fingers 81 are progressed in the direction of the arrow 84 in Fig. 2, the progressor frame 40 may be raised and lowered so that the tips of fingers 81 may approximate the contour of the top surface of the treating brushes 13.

Any suitable means for reciprocating the progressor frame 40 in a vertical plane, may be provided. One form of such means may include a pair of spaced, transversely extending crankshafts 85 and 86 journalled in bearings 87 supported upon standards 88 suitably mounted upon the frame side rails 11 and 12. A pair of crossheads 89 may be journalled upon the throw 90 of each crankshaft, and each crosshead may be provided with anti-friction means such as the rollers 91. Each angle iron side rail 41 of the progressor frame 40 may be provided with bearing plates 92 located to rest upon the rollers 91 of the crossheads. By this arrangement, as the crankshafts 86 are rotated together, the crossheads 89 journalled upon the throws of the crankshafts, are caused to travel around a circular path described by the crankshaft throws, and as the progressor frame 40 is mounted on the crossheads 89, the progressor frame is thereby reciprocated in a vertical plane. Anchor means may be provided for substantially preventing the progressor frame from moving longitudinally with the crossheads, which means may include a pair of spaced links 93, which links at one end may be journalled upon the transverse drive shaft 53 by means of bearings 94, and at the other end may be journalled upon the countershaft 95. The countershaft 95 may be journalled in bearings 96 of standards 97, which standards may be suitably mounted on the frame side rails 11 and 12. By this arrangement the progressor frame may be reciprocated in a vertical plane by the crossheads, but is prevented from substantial longitudinal movement. During the rotation of the crankshafts the crossheads may slide freely due to the anti-friction rollers 91, back and forth along the progressor bearing plates 92, causing only a rising and falling motion of the progressor frame.

Means may be provided for driving the progressor conveyor and the crankshafts in timed relation, whereby the progressor fingers 81, while traveling through the machine, may approximately follow the contour of the upper surface of the treating brushes 13. The drive means for the progressor may include a standard form of speed regulator 98, operatively connected to the countershaft 23 by means of pulleys 99, 100 and belt 101, while the shaft 102 may be driven at a selected speed by the regulator 98, by means of pulleys 103, 104 and the crossed belt 105. The shaft 102 may be supported upon the standards 10 by means of suitable bearings 106, and may be operatively connected to drive crankshaft 85 by means of sprockets 107, 108, and chain 109. Crankshaft 86 may be driven directly from the crankshaft 85 by means of sprockets 110, 111, and chain 112. And the progressor conveyor may be driven from crankshaft 85 by means of sprockets 113, 114, and chain 115, for driving the countershaft 95 from which the progressor conveyor drive shaft 53 may be in turn, driven by means of sprockets 116, 117, and chain 118, and the progressive conveyor chain sprockets 55 are mounted upon and driven by means of shaft 53. By this arrangement the crankshafts and progressor conveyor may be driven in timed relation. Each of the links 93 may carry an idler sprocket 119, which sprockets may be adjustably mounted on the links 93 and in alignment with chain 118, whereby the chain 118 may be tightened as desired. By arranging the progressor conveyor drive between the drive shaft 53 and the countershaft 95, and interconnecting these shafts by means of links 93, the up and down motion of the progressor frame may not affect the adjustment of the drive chain 118, as the links 93 act to maintain these shafts equally spaced and the drive chain 118 at a given adjustment.

The fruit feed means 5 may be provided for delivering to the first of the treating brushes 13, a row of fruit to be treated. The fruit feed means 5 may include a conveyor having closely spaced, transverse rollers 120 for conveying a row of fruit for each roller. The rollers 120 may be carried between chains 121 traveling over spaced sprockets 122 mounted upon the drive shaft 123, which shaft may be journalled upon the machine frame 7 by bearings 124. It is important that the fruit feed means operate in timed relation with the progressor conveyor, so that a row of fruit may be delivered to the treating brushes between each of the progressive bars 67, and for this purpose the drive means for the fruit feeding means, may be operatively connected to the drive means for crankshaft 86, which in turn is driven in timed relation with the progressor conveyor. The drive means for the fruit feeding means may include a jack shaft 125 mounted in the bracket 126 formed integral with one of the standards 88 which support crankshaft 86. A sprocket 127 may be journalled upon the jack shaft 125 to operatively engage the crankshaft drive chain 112, and said sprocket 127 may be provided with a hub 128 upon the outer end of which may be mounted the drive sprocket 129. A sprocket 130 may be mounted upon the outer end of the drive shaft 123, and may be driven by the drive sprocket 129 by means of chain 131, thus driving the fruit feeding means in timed relation with the crankshafts 85 and 86, and also in timed relation with the progressor conveyor, whereby fruit will be delivered to the machine between each of the progressor bars 67. As the drive means for the progressor conveyor, crankshafts and fruit feed means are all interconnected, it will be appreciated that by adjusting the speed regulator, these elements will be simultaneously speeded up or slowed down, while the speed of the treating brushes will remain substantially constant. Therefore, the treating period for any given lot of fruit may be nicely adjusted, that is, by speeding up the progressor the fruit will be progressed through the machine in less time, and therefore, will receive less treatment; and conversely, by slowing down the progressor, the fruit will take a longer time to progress through the machine, and therefore, will receive treatment for a greater length of time.

The operation of the machine may be briefly stated as follows: The motor 20 may be set into operation and the speed regulator 98 set for the duration of treatment necessary for the lot of fruit to be acted upon. Fruit may be then fed to the lower end of the fruit feed means 5 by any of the well-known means now in common use, and therefore not shown, whereby a row of fruit will be carried in the trough formed between the rollers 120 thereof and deposited onto the first of the treating brushes 13, as soon as the fingers 81 carried by the progressor bar 67 have moved out of range of the fruit being deposited by the feed means, whereupon the fruit will be rolled by the rotation of the treating brush 13 into the trough 83 formed between the first and second treating brushes. As all of the brushes are revolving at the same speed and in the same direction, the fruit will align itself in a row in the trough 83, and will remain in the trough, rolling over and over until the next set of fingers 81 carried by the next progressor bar 67 engages the fruit and boosts it out of the trough formed between the first and second set of brushes into the trough formed between the second and third set of brushes. As soon as the fruit has been boosted to near the top surface of the brush, the rotation of the brush will carry the fruit ahead into the next trough where it will be rolled over and over until the fingers again catch up to the fruit and boost it into the next succeeding trough, and so on until the fruit will have traversed the full length of the machine, whereupon the treated fruit may be discharged onto a suitable conveyor, not shown. Due to providing resilient fingers which travel along a path approximately the contour of the brushes, the fruit is gently progressed from one trough to the next, thus the fruit may be progressed with substantially no bruising or injury whether the fruit progressed is large, small or oddly shaped.

As the progressor boosts the first row of fruit from the trough formed between the first and second treating brushes to the next trough, the fruit feed means may deposit another row of fruit onto the first treating brush to be carried thereby into the first trough, and so on until the entire lot of fruit has been treated.

In the modified form of the invention as illustrated in Figures 7, 8, 9 and 10, the brushing machine and fruit feeding means are of substantially the same construction as illustrated in Figures 1 to 6 inclusive, while the progressor means differs, in that the progressor frame is given a circular motion, and is not provided with the progressor conveyor, as due to the circular motion of the frame, the fruit engaging members carried directly thereby, will act to boost the rows of fruit from one trough to the next, and during the return motion will rise above the fruit so as not to interfere with the progression of the fruit through the machine.

The modified form of the progressor may include a floating or progressor frame 140 having a pair of side rails 141 connected together by a number of equally spaced progressor bars 142. The progressor bars 142 may be spaced along the side rails 141 at distances equal to the spacing of the treating brushes of the brushing machine, and each progressor bar may be positioned to be in alignment with one of the troughs formed between the treating brushes when at the top or bottom of its stroke.

The means for giving to the progressor frame a circular motion, may include a pair of spaced crankshafts 143 and 144 suitably journalled upon the brushing machine frame, and by providing each side rail with bearings 145 journalled upon the throws 146 of the crankshafts. The bearing 145 may be suitably mounted upon the side rails 141 by means of bolts 147, and reinforcing blocks 148 may be provided for stiffening the side rails adjacent each bearing.

As will be observed, the crankshafts fully support the progressor frame, and it is therefore only necessary to drive the crankshafts in unison so that the throws 146 of both crankshafts rise and fall simultaneously in order to give to the frame a circular motion equal in extent to the circular path described by the throws of the crankshafts.

Each of the progressor bars 142 may be suitably fastened at each end to one of the progressor frame side rails 141, as by means of angle plates 149. One flange of each angle plate may be fastened to the adjacent side rail as by rivets 150, while the end of the progressor bar may be fastened to the other flange of the angle plate as by means of bolts 151.

Figure 9:
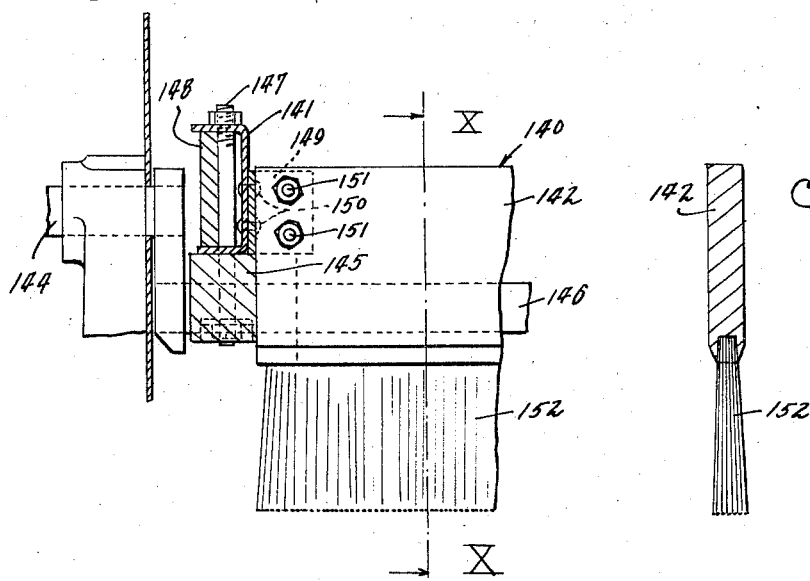
Figure 9 illustrates an enlarged, sectional detail of the means for mounting the progressor frame on the crankshafts, and the means for mounting the progressor bar upon the progressor frame.
Figure 10:
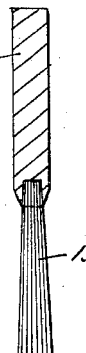
Figure 10 illustrates a sectional view of the progressor bar taken substantially in the plane of line 10—10 of Fig. 9.

A fruit engaging means 152 may be suitably fastened to the lower edge of each progressor bar. The fruit engaging means may be formed of rubber fingers, as illustrated in Figures 3, 5 and 6, or of bristle material as illustrated in Figures 7, 9 and 10, or may be formed of sheet rubber or other suitable material.

Figure 8:
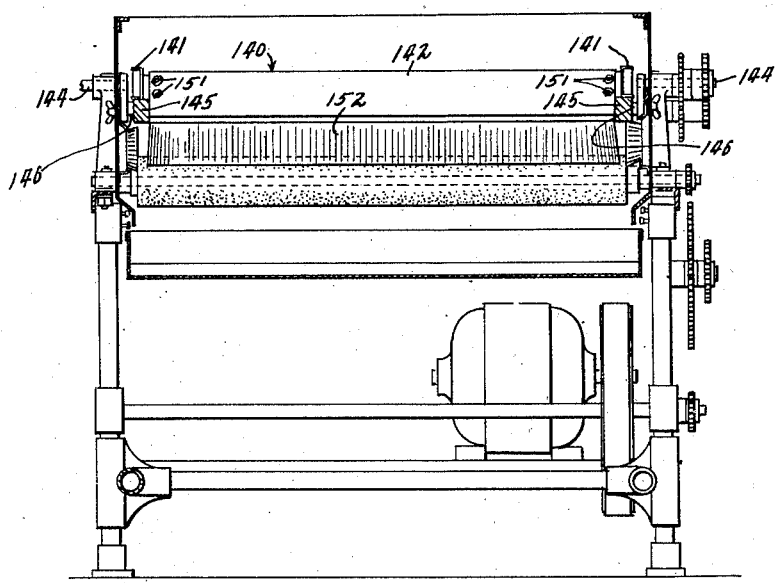
Figure 8 illustrates a sectional view taken substantially in the plane of line 8—8 of Fig. 7.

As will be observed in Figures 7 and 8, the fruit engaging means 152 when in their lowermost position, project into the troughs 153 formed between adjacent fruit treating brushes, and the end of each of the fruit engaging means 152 will follow a circular path as illustrated in broken lines in Fig. 7 at 154. As the fruit engaging means travel around the circular course 154 in the direction indicated by the arrow 155, the fruit lodged in the troughs formed between the treating brushes, will be gently engaged and boosted to the next succeeding trough, and during a further portion of the travel, the fruit engaging means will rise above the fruit progressed into the adjacent troughs and finally return in back of this fruit to boost it over to the next succeeding troughs, which periodic boosting of the fruit from one trough to the next, will continue until the fruit will have traversed the entire length of the machine.

The drive means for the treating brushes, progressor and fruit feeding means, are substantially the same as previously described for the form of machine illustrated in Figs. 1 to 6 inclusive, excepting that the drive means for the progressor conveyor has been eliminated, and therefore it is deemed unnecessary to repeat the description of these parts. It is important however, as in the form of the machine previously described, that the progressor and fruit feeding means should operate in timed relation so that the fruit may be fed into the machine when the progressor frame is in its elevated position, in order that the fruit delivered by the fruit feeding means may be carried by the rotation of the first treating brush into the first trough from which the progressor will boost the fruit into the next trough, and so on until the fruit will have progressed through the machine. It is also important that the fruit feeding means deliver one row of fruit only for each cycle of operation of the progressor, so as not to overload the brushing machine.

It will be appreciated that by the use of either form of progressor that the fruit will be conveyed in an orderly fashion and at an even rate through the brushing machine, thereby insuring that all of the fruit, whether large or small, will receive the same degree of treatment while passing through the machine.

Having fully described the invention, it is to be understood that it is not to be limited to the details herein set forth, but the invention is of the full scope of the appended claims.

I claim:

1. In a fruit treating machine, a frame, a plurality of cylindrical brushes journalled transversely of said frame, means for driving said brushes, a progressor frame operatively mounted upon said frame, means for reciprocating said progressor frame in a vertical plane, an endless conveyor means operatively mounted upon the progressor frame, a plurality of progressor bars operatively carried by the conveyor means, said progressor bars being spaced along the conveyor means at distances substantially equal to the spacing of the brushes, a plurality of relatively closely spaced resilient fingers projecting from each of the progressor bars, and means for driving the conveyor means in timed relation with the reciprocations of the progressor frame for causing the tips of the resilient fingers to travel along a path approximating the contour of the adjacent brushes.

2. In a fruit treating machine a frame, a plurality of cylindrical brushes journalled transversely of said frame, means for driving said brushes, a progressor frame mounted in the frame above said brushes, conveyor means operatively mounted upon the progressor frame, a plurality of progressor bars carried by the conveyor means, said progressor bars being spaced along the conveyor means at distances substantially equal to the spacing of the brushes, a plurality of relatively closely spaced resilient fingers projecting from each of the progressor bars and extending to the proximity of the adjacent surfaces of said brushes, and a driving means for the conveyor.

3. In a fruit treating machine, a frame, a plurality of cylindrical brushes journalled transversely of said frame, means for driving said brushes, a progressor frame operatively mounted upon the frame, means for reciprocating the progressor frame in a vertical plane, a conveyor means operatively mounted upon the progressor frame, a plurality of progressor bars carried by the conveyor means, said progressor bars being spaced along the conveyor means at distances substantially equal to the spacing of the brushes, a plurality of fingers projecting from each of the progressor bars, and means for driving the conveyor means in timed relation with the reciprocations of the progressor frame for causing the fingers to travel along a path approximating the contour of the adjacent brushes.

4. A progressor mechanism for assisting the fruit out of the troughs formed between the transversely positioned treating brushes, of a fruit treating machine including a frame, a pair of spaced crankshafts journalled transversely of the frame, a pair of crossheads journalled upon the throw of each crankshaft, a progressor frame operatively mounted upon said crossheads, an anchor means for connecting the frame and progressor frame arranged to permit a reciprocatory motion of the progressor frame in a vertical plane but preventing longitudinal motion thereof, a conveyor means operatively mounted upon the progressor frame, fruit engaging means carried by the conveyor for assisting fruit lodged in one trough formed between adjacent treating brushes to the next trough, and a drive means for actuating the crankshafts and conveyor in timed relation.

5. A progressor mechanism for assisting the fruit out of the troughs formed between the transversely positioned treating brushes of a fruit treating machine including a frame, a progressor frame operatively mounted in the frame, means mounted in the frame for reciprocating the progressor frame in a vertical plane, a conveyor means operatively mounted upon the progressor frame, fruit engaging means carried by the conveyor for assisting fruit lodged in one trough formed between adjacent treating brushes to the next trough, and a drive means for actuating the progressor frame, reciprocating means and the conveyor means in timed relation.

6. A progressor mechanism for assisting fruit out of the troughs formed between the transversely positioned treating brushes of a fruit treating machine including a frame, a progressor frame operatively mounted in the frame, means mounted in the frame for reciprocating the progressor in a vertical plane, a conveyor means operatively mounted upon the progressor frame for assisting fruit lodged in one trough formed between adjacent treating brushes to the next trough, and a drive means for actuating the progressor frame, reciprocating means and the conveyor means in timed relation.

7. A progressor mechanism for assisting fruit out of the troughs formed between the transversely positioned treating brushes of a fruit treating machine including a frame, a pair of spaced crankshafts journalled transversely of the frame, a progressor frame operatively associated with the throws of said crankshaft for a reciprocatory motion in a vertical plane, a conveyor means operatively mounted upon the progressor frame, fruit engaging means carried by the conveyor for assisting fruit lodged in one trough formed between adjacent treating brushes to the next trough, and a drive means for actuating the crankshafts and conveyor in timed relation.

8. A progressor mechanism for assisting fruit out of the troughs formed between the transversely positioned treating brushes of a fruit treating machine including a frame, a pair of spaced crankshafts journalled transversely of the frame, a pair of crossheads journalled upon the throw of each crankshaft, a progressor frame operatively mounted upon said crossheads, an anchor means for connecting the progressor frame to the frame arranged to permit a reciprocatory motion of the progressor frame in a vertical plane but preventing longitudinal motion thereof, a conveyor means operatively mounted upon the progressor frame, a plurality of progressor bars carried by the conveyor means, said progressor bars being spaced along the conveyor means at distances substantially equal to the spacing of the treating brushes, a plurality of fingers projecting from each of the progressor bars, and means for driving the crankshafts and conveyor means in timed relation for causing the fingers to travel along a path approximating the contour of the adjacent brushes.

9. A progressor mechanism for assisting fruit out of the troughs formed between the transversely positioned treating brushes of a fruit treating machine including a frame, a pair of spaced crankshafts journalled transversely of the frame, a drive means for simultaneously actuating the crankshafts, a progressor frame operatively mounted upon the throws of the crankshafts, a plurality of fruit engaging means mounted upon said progressor frame, and said fruit engaging means being spaced along the progressor frame at distances substantially equal to the spacing of the treating brushes.

10. A progressor mechanism for assisting fruit out of the troughs formed between the transversely positioned treating brushes of a fruit treating machine including a frame, a plurality of crankshafts journalled upon said frame, a drive means for simultaneously actuating the crankshafts, a progressor operatively mounted upon the throws of said crankshafts, a plurality of fruit engaging means mounted upon said progressor, and said fruit engaging means being spaced along the progressor at distances substantially equal to the spacing of the treating brushes.

11. In a fruit treating machine, a frame, a plurality of cylindrical brushes journalled transversely of said frame, means for driving said brushes, a progressor frame operatively mounted upon said frame, means for reciprocating the progressor frame in a vertical plane, an endless conveyor means operatively mounted upon the progressor frame, a plurality of fruit engaging means operatively carried by the conveyor means, a fruit feed means and a drive means operative for synchronously driving the conveyor means, the progressor frame reciprocating means and the fruit feed means all in timed relation.

12. In a fruit treating machine, a frame, a plurality of cylindrical brushes journalled transversely of said frame, means for driving said brushes, a progressor frame operatively mounted upon said frame for movement in a vertical plane, means for reciprocating the progressor frame in a vertical plane, an endless conveyor means operatively mounted upon the progressor frame, a plurality of fruit engaging means operatively carried by the conveyor means, a fruit feed means, a drive means operative for synchronously driving the conveyor means, the progressor frame reciprocating means and the fruit means all in timed relation, and a speed change means associated with said last mentioned drive means operative for simultaneously changing the speed of said conveyor means, said progressor frame reciprocating means and of the said fruit feed means.

13. In a progressor mechanism for assisting fruit out of the troughs formed between the transversely positioned cylindrical treating members of a fruit treating machine, a frame for the machine, a progressor frame, fruit moving means on said progressor frame, and means including said progressor frame for causing said fruit moving means to have combined horizontal and vertical movement above the said troughs.

14. In a progressor mechanism for assisting fruit out of the troughs formed between the transversely positioned treating rolls of a fruit treating machine, a frame for the machine, a progressor frame having a plurality of fruit engaging means spaced therealong at distances substantially equal to the spacing of fruit treating rolls, and means including said progressor frame for causing said fruit engaging means to have combined horizontal and vertical movements above the said troughs.

FRED STEBLER.